March 12, 1929.  L. G. LINDSAY  1,704,982
WATER SOFTENING APPARATUS
Filed July 14, 1927   3 Sheets-Sheet 1
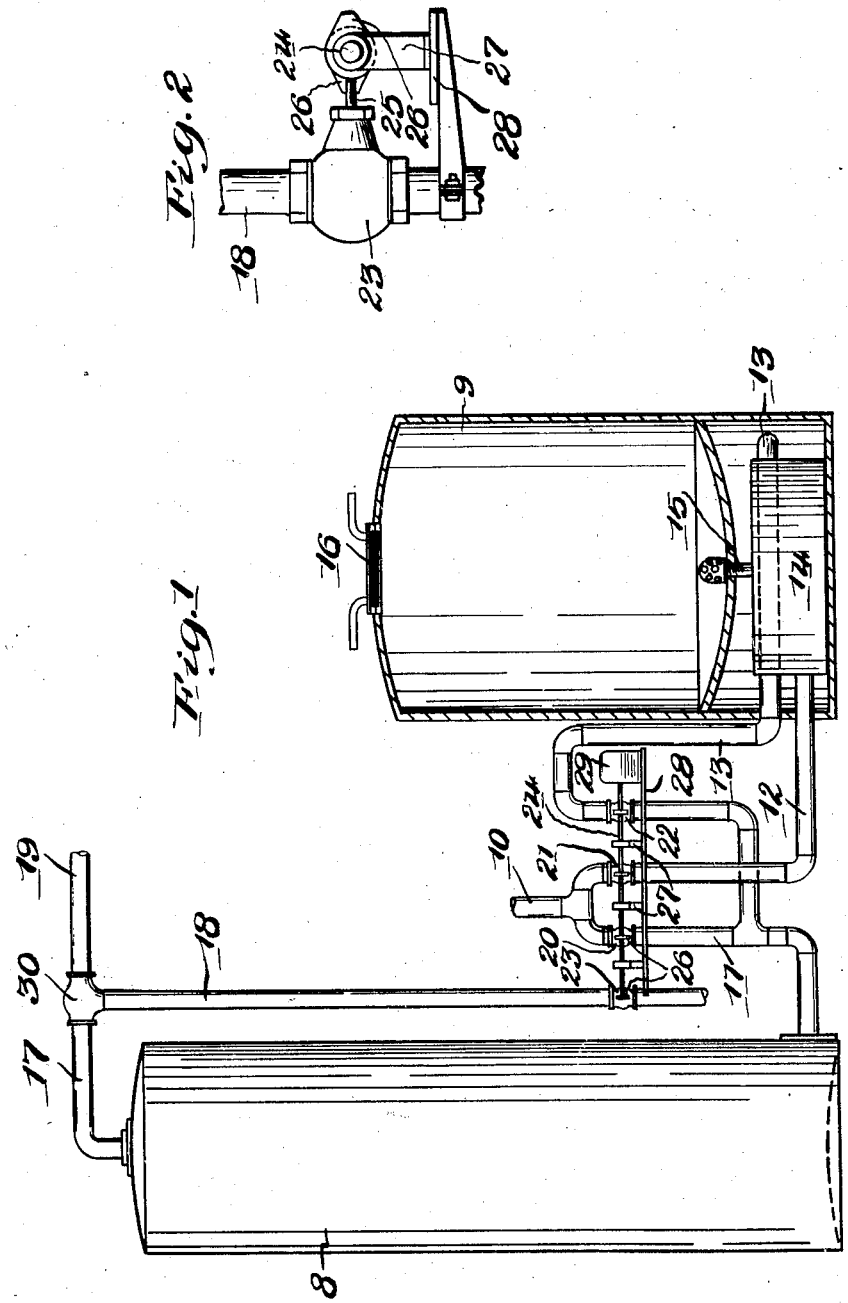

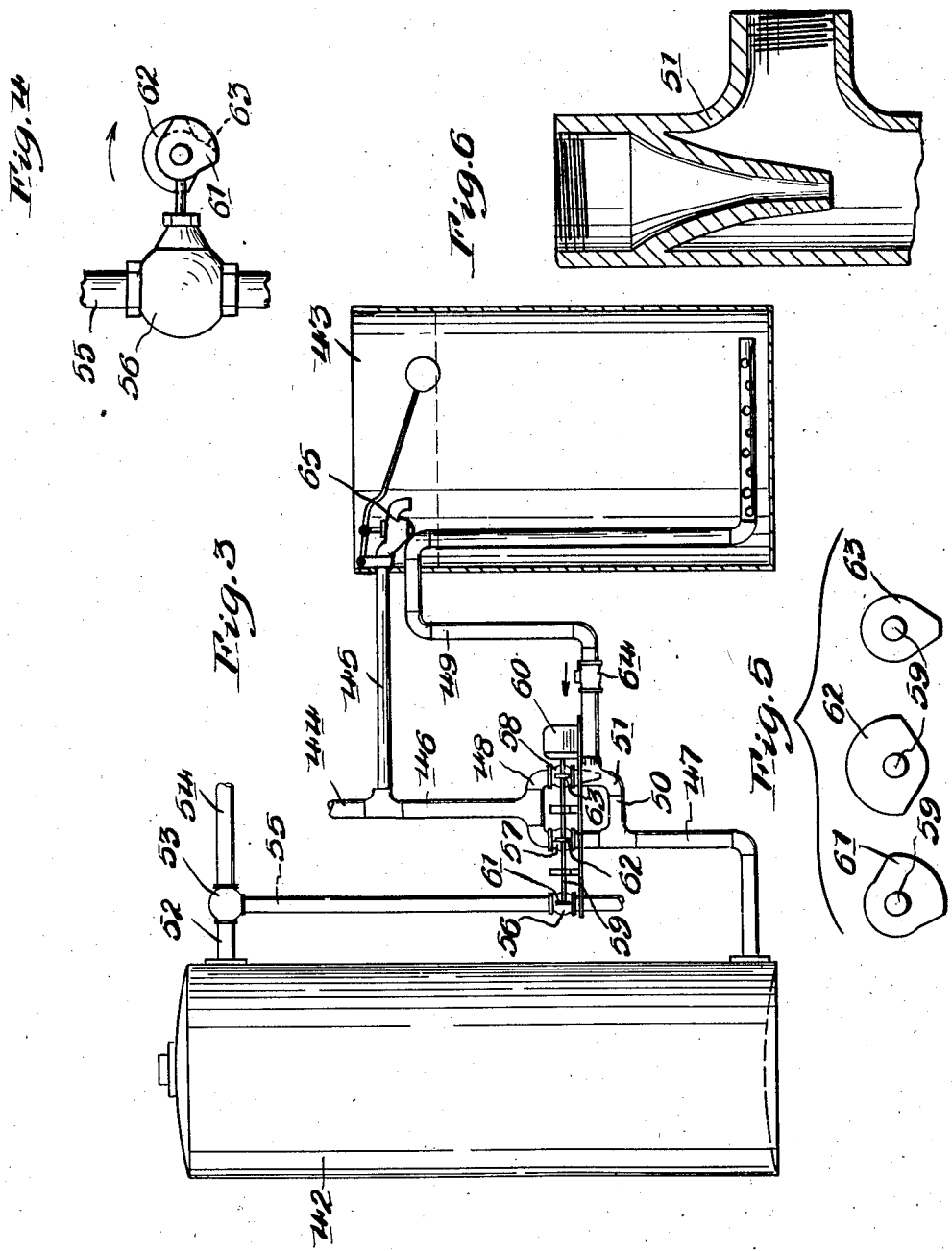

March 12, 1929. L. G. LINDSAY 1,704,982
WATER SOFTENING APPARATUS
Filed July 14, 1927   3 Sheets-Sheet 3
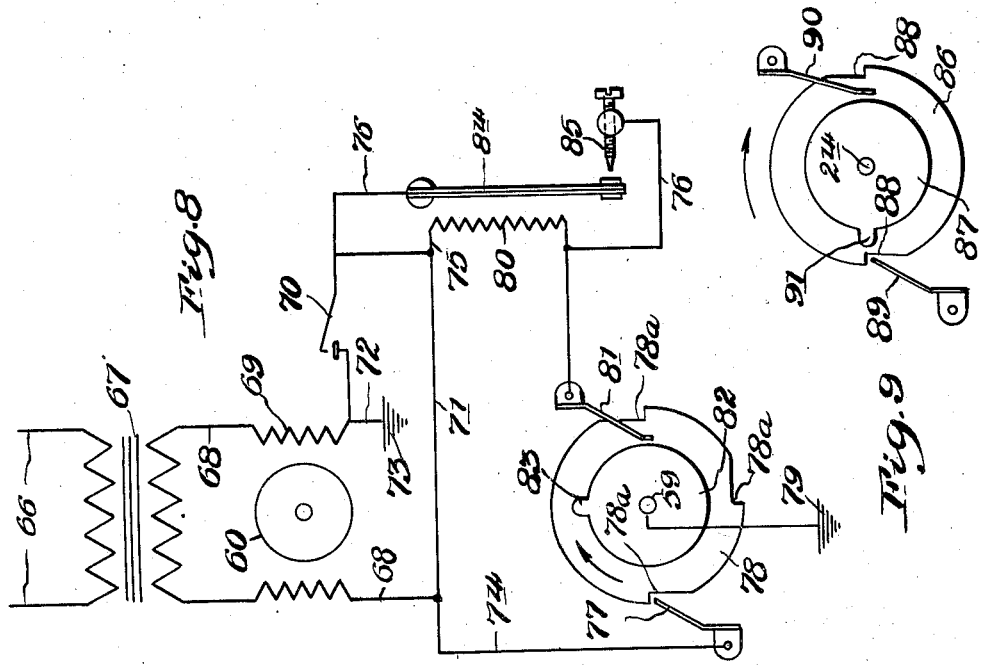
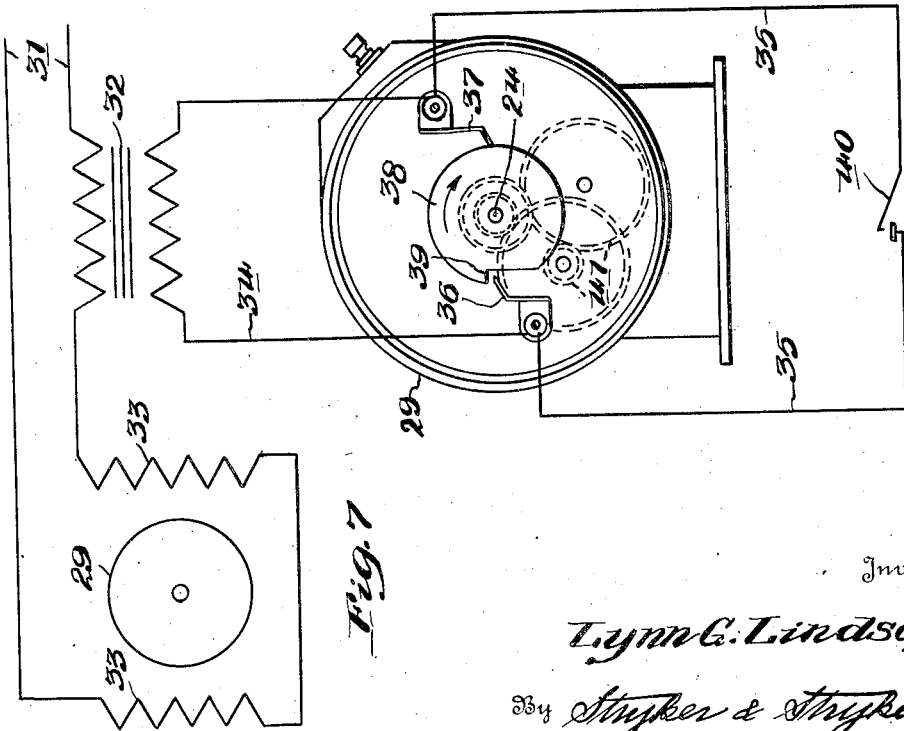
Inventor
Lynn G. Lindsay
By Stryker & Stryker
Attorneys Patented Mar. 12, 1929.

1,704,982

UNITED STATES PATENT OFFICE.

LYNN G. LINDSAY, OF MINNEAPOLIS, MINNESOTA, ASSIGNOR TO TRUPAR MANUFACTURING COMPANY, OF DAYTON, OHIO, A CORPORATION OF OHIO.

WATER-SOFTENING APPARATUS.

Application filed July 14, 1927. Serial No. 205,713.

This invention relates to improved apparatus for softening water by the use of zeolites or base exchange silicates.

It is my object to provide in a water softener of this type a novel and simple arrangement of valves and electrical actuating mechanism whereby control of the successive periods of softening and regeneration of the zeolites is facilitated without greatly increasing the cost of the apparatus.

More particularly, it is my object to provide an improved arrangement of valves and electrically controlled valve operating mechanism in which a motor driven shaft has suitable cams mounted thereon adapted to actuate a series of valves disposed in parallel relation to the motor driven shaft. My invention also includes certain other novel features of construction which will be more fully pointed out in the following specification and claims.

Referring to the drawings, Figure 1 is a side elevation partially in central vertical section showing one form of my improved water softening apparatus; Fig. 2 is a detail of one of the valves and its operating mechanism; Fig. 3 is a side elevation partly in section showing a different form of the invention; Fig. 4 is an end view of the cam shaft and cams for operating the valves shown in Fig. 3; Fig. 5 is a detail of the several cams shown separately; Fig. 6 is a central vertical section through the ejector or suction element employed in the device shown in Fig. 3; Fig. 7 is a diagrammatic illustration of circuits, switches, and motor suitable for operating the arrangement of valves shown in Fig. 1; Figure 8 is a diagrammatic view of the circuits and controls for the valve arrangement shown in Fig. 3 and Fig. 9 illustrates another form of rotary switch for use in the circuits shown in Fig. 8.

As shown in Fig. 1, I provide a container 8 consisting of pressure tank which contains a bed of zeolites or base exchange silicates. Brine for regenerating the zeolites is supplied from a brine tank 9. A water supply pipe 10 has branches 11 and 12 respectively communicating with the base of the zeolite container 8 and brine tank 9. A branch 13 of the pipe 11 communicates with one side of a drum 14 for brine, the opposite side of said drum communicating with the pipe 12.
A short nipple or pipe 15 connects the base of the brine tank with the interior of the drum 14. The tank 9 may be charged with salt through a removable cap 16. Communicating with the top of the zeolite container 8 is a pipe 17 having a branch 18 adapted to be connected to a sewer or other place of waste disposal, and a branch 19 connected to the service or house line from which the softened water is withdrawn.

Four valves are provided to control the flow of water and brine to and from the container 8. These valves, which are indicated by the numerals 20, 21, 22, and 23 are located in the pipes 11, 12, 13, and 18 respectively, being arranged in a horizontal line in parallel relation with a motor driven shaft 24. These control valves are of the standard " whistle " type, and are normally held in closed position by springs located in the valves. The valve operating stems 25 (Fig. 2) severally project adjacent to cams 26 which are fixed on the shaft 24 in such positions as to actuate the valve stems when said shaft is rotated. A projecting segment of the cam 26 for operating the valve 20 is located at an angle of 180 degrees relative to similar projections on the cams for operating the valves 21, 22, and 23 so that said valve 20 is open when the other valves are closed, and is closed when the valves 21, 22, and 23 are open. Suitable bearings 27 for the shaft 24 are supported upon a plate 28 adapted to be secured to the pipes or other suitable support adjacent to the valves. An electric motor 29 is disposed with its drive shaft in axial alinement with the shaft 24 upon the plate 28. At the junction of the pipes 18 and 19 with the pipe 17, a pressure reducing valve 30 is mounted. This valve 30 has a continuously open passageway between the pipes 17 and 18, but normally closes the passage between the pipe 19 and pipes 17 and 18. The valve 30, which may be of any common or suitable design, is preferably adjusted so as to open communication between the pipes 17 and 18 only when the pressure in the pipe 17 exceeds by about 5 pounds per square inch the pressure in the pipe 19. Thus when the valve 23 is open, fluid is prevented from passing into the service pipe 19.

As illustrated in Fig. 7, suitable circuits and switches for controlling the motor 29 comprise a main current supply circuit 31, including the preliminary coil of a transformer 32 and the field coils 33 of the motor 29 and control circuits 34 and 35. The circuit 34 includes the secondary coil of the transformer 32, and spring contacts 36 and 37 arranged to be connected by a rotary switch element 38 which is fixed on the valve operating shaft 24. A notch 39 in the periphery of the element 38 is provided to open the circuit between the contacts 36 and 37 as hereinafter described. The circuit 35, which is adapted to shunt the contacts 36 and 37 and element 38, includes a switch 40, normally open, but adapted to be manually closed to start the motor. To connect the shaft 24 with the motor shaft, a suitable train of speed reducing gears 41 is provided.

In the alternate form of my device shown in Figs. 3 to 6 inclusive and 8, a closed container 42 for zeolites, similar to the container 8 is provided but the device is adapted for use in connection with an open brine tank 43, and the number of control valves is reduced. A hard water supply pipe 44 has a branch 45 for filling the brine tank 43, and a branch 46 communicates through a pipe 47 with the bottom of the container 42. A branch 48 of the pipe 46 is connected by a pipe 49 with the base of the brine tank 43 and by an ejector 51 and pipe 50 with the pipe 47. An outlet pipe 52, communicating with the top of the container 42, connects through a pressure reducing valve 53 with a service pipe 54 and also with a waste pipe 55. Valves 56, 57, and 58 are arranged in alignment to be operated by cams upon a shaft 59, and said shaft is connected to a motor 60. As best shown in Figs. 5 and 4, a cam 61 is fixed on the shaft 59 to operate the valve 56, and cams 62 and 63 operate the valves 57 and 58 respectively. The supports and bearings for the shaft 59 are similar to the bearings 27 and support 28 for the shaft 24. A check valve 64 mounted in the pipe 49 allows flow of brine into the pipe 47 but prevents the flow of water in the reverse direction. Upon the end of the pipe 45 in the top of the tank 43, a float valve 65 is arranged to maintain a substantially constant level of liquid in the brine tank.

Suitable electric circuits and control switches for the motor 60 are shown in Fig. 8. As here shown, power supply wires 66 are connected to a transformer 67, and the secondary coil of this transformer is included in a circuit 68 containing the field coils 69 of the motor 60. In the circuit 68 is also located a starting switch 70 and a wire 71. A branch wire 72, connected to one side of the motor circuit, is grounded at 73 and three parallel branch circuits 74, 75, and 76 are provided to severally complete the motor circuit when the switch 70 is open. The circuit 74 includes a spring contact 77 and a rotary switch element 78 which is grounded at 79, the element 78 having three notches 78ª to open the circuit. The circuit 75 includes the resistance element 80 of a thermostatic time switch, a spring contact 81 and a rotary switch element 82 which is grounded at 79. The elements 78 and 82 are fixed on the shaft 59 and a projection 83 on the element 82 is provided to complete the circuit 75 when in contact with the member 81. The circuit 76 includes a bimetal arm 84 of the thermostatic time switch, a contact 85, and the spring contact 81.

In Figure 9 I have illustrated a rotary switch, primarily adapted for use in the circuits illustrated in Fig. 8 in place of the rotary switch shown therein, and for controlling the valve arrangement shown in Fig. 1. This switch makes it possible to effect regeneration and return of the softener to service by a single closing of the switch 70. To this end, switch elements 86 and 87 are fixed upon the shaft 24 so as to rotate therewith. The element 86 has notches 88 in its periphery arranged diametrically opposite each other and a spring contact 89 is provided to engage the periphery of said element, being adapted to be connected to the circuit wire 74. A spring contact 90 is disposed adjacent to the element 87 and normally out of contact with said element, but extending into the path of a projection 91. The contact 90 is connected in circuit in the place of the contact 81, shown in Fig. 8, and the elements 86 and 87 are grounded. Thus, by merely substituting the switch shown in Fig. 9 for the rotary switch shown in Fig. 8, the circuits of Fig. 8 are adapted to use in controlling valves, arranged as shown in Fig. 1.

*Operation.*

The operation of the apparatus shown in Figs. 1, 2 and 7 is as follows: A quantity of salt for regeneration is placed in the tank 9, and said tank is partially filled with water so that brine is formed and passes by gravity through the pipe 15 into the drum 14. Thus, the drum 14 is normally filled with a strong solution of salt, and granular salt is excluded by a suitable strainer. In the normal operation, that is when soft water is being withdrawn through the pipe 19, the valve 20 is open and the valves 21, 22 and 23 are closed, the valve 20 being held in open position by its cam 26. Now hard water enters through the pipe 10 and passes through the pipe 11 into the bottom of the container 8, thence upward through the bed of exchange silicates where it is softened. The softened water passes out through the pipe 17, pressure reducing valve 30 and pipe 19. When the bed of zeolites requires regeneration, the switch 40 may be closed manually. This starts the motor 29 through the circuits 34 and 35. As soon as the motor starts, the switch element 38 is rotated in the direction indicated by an arrow in Fig. 7 to bring the spring contact 36 into engagement with said switch element, and thereby close the circuit 34 and shunt the circuit 35. The motor continues to rotate the shaft 24 until the element 38 has made one half of a revolution or until the notch 39 reaches the spring contact 37 when the motor stops. During this half revolution of the shaft 24, three of the cams 26 open the valves 23, 21 and 22, and the fourth closes the valve 20. Thus, water under pressure, entering through the pipe 10, passes through the pipe 12 into one side of the drum 14 and expels the brine therefrom through the pipes 13 and 11 into the base of the container 8. The brine rises gradually through the bed of exchange silicates and regenerates the same, and is then forced out of the top of the container 8 and is wasted through the pipes 17 and 18. The brine is followed by wash water which continues to flow upward through the bed of zeolites until the switch 40 is again closed. It will now be understood that upon the closing of the switch 40 the position of the valves is reversed, the valve 20 being again opened and the valves 21, 22 and 23 being returned to the closed, initial position. The regeneration is effected by a measured quantity of brine contained in the drum 14. After regeneration, the fresh water in the drum 14 is slowly replaced by brine which gravitates through the pipe 15 into the drum. I prefer to maintain a cushion of air above the brine in the tank 9, and this predetermined amount of air and the volume of liquid in the tank 9 remains substantially constant throughout the operation of the softening apparatus.

With the arrangement of apparatus shown in Figs. 3, 4, 5, 6 and 8, the valves 56 and 58 are normally closed, and the valve 57 is open, being held open by the cam 62. Thus, water to be softened enters through the pipe 44 and flows through the pipes 46 and 47 into the bottom of the container 42. In passing upward through the exchange silicates in the container 42, the water is softened and passes out through the pipe 52, the pressure reducing valve 53 and service pipe 54. A single manipulation of the control switch 70 effects regeneration and subsequent washing of the bed of water softening material.

When regeneration is required, the switch 70 is closed momentarily. This completes the motor circuits 68 and 71, and starts the motor, which in turn rotates the valve shaft 59 through suitable speed reducing gears such as the gears 41 shown in Fig. 7. The motor turns the switch elements 78 and 82 on the shaft 59 and brings the contact 77 into engagement with the switch element 78. Now the circuit 74 is completed through the contact 77, switch element 78, ground 79, and grounded wire 72. Rotation of the shaft 59 is thus continued for one quarter of a revolution, during which the cam 62 allows the valve 57 to close, and the cams 61 and 63 open the valves 56 and 58. Upon the opening of these valves, water is caused to flow from the pipes 44 and 46 through the ejector 51 which draws brine from the bottom of the tank 43 through the pipe 49. The brine thus withdrawn from the tank 43 is forced into the bottom of the container 42 where it regenerates the zeolites and is then wasted through the pipes 52 and 55. After a quarter revolution of the elements 78 and 82, rotation is stopped. Thus, the spring contact 77 drops into the second notch 78$^a$ to open the motor circuit and stop the motor. Simultaneously with the entering of the contact 77 into the notch 78$^a$, the projection 83 on the element 82 makes contact with the spring contact 81 to complete the circuit 75, containing the resistance element 80, the ground 79, and grounded wire 72. The resistance of the element 80 is such that the motor does not operate when it is in circuit. The element 80 now heats the bimetallic arm 84 and within a predetermined period of time said arm is caused to bend and to make contact with the element 85 in the circuit 76. Withdrawal of brine from the tank 43 is thus continued until the bimetallic arm 84 has been heated sufficiently to cause it to make contact with the element 85. Adjustment of the position of the element 85 is provided for by constructing it in the form of a screw adapted to be turned toward or away from the arm 84. With quick regenerating zeolites in the container 42 enough brine for regeneration may be withdrawn from the tank 43 by operating the ejector 51 for about 30 seconds. In such case, a time switch may be used which will operate to close the circuit 76 after the resistance 80 has been heated for 30 seconds by the closing of the circuit 75 through the projection 83.

When the circuit 76 is completed through elements 84 and 85 and projection 83 on the switch 82, the motor circuit is again grounded at 79, and the motor rotates the shaft 24 another quarter of a revolution. Before the projection 83 passes out of contact with the spring 81, the contact 77 has completed the circuit through the switch element 78.

The effect of this second quarter turn of the shaft 59 is to retain the waste pipe valve 56 in open position by means of the cam 61, to close the brine valve 58 with the cam 63 and open the valve 57 under the action of the cam 62. Now wash water is caused to replace the brine in the zeolite bed and then to wash out sediment therefrom, the overflow wasting through the pipe 55. This washing operation continues until the switch 70 is again closed.

To return the softener to service, the switch 70 is closed and the motor started. As soon as the motor starts the element 78 is turned to close the circuit 74. In this manner, the shaft 59 is turned one half a revolution or until the spring contact 77 enters the first notch 78ª. During this half turn of the shaft 59, the valve 56 is allowed to close, the valve 57 is retained in open position by the cam 62, and the valve 58 is allowed to remain in closed position. The tank 43 is kept filled with brine by the operation of the float valve 65 as long as the supply of salt is present therein.

The operation of the softening apparatus, shown in Fig. 1, may be controlled by the switch shown in Fig. 9 in the circuits and with the motor 60, shown in Fig. 8, the motor 60 being substituted for the motor 29 in Fig. 1. To effect regeneration the switch 70 is closed. This completes the motor circuit 71 so that the motor turns the shaft 24 and switch element 86 until the contact 89 engages said element to complete the circuit 74 and 73. Now the motor continues in operation until the element 89 enters the second notch 88 or until the element 86 has made one half of a revolution. The shaft 24 and cams 26 are thus caused to open the valves 21, 22 and 23 and to close the valve 20. When the contact 89 enters the second notch 88, the circuit 74 is opened to stop the motor. Simultaneously with the stopping of the motor, the projection 91 engages the contact 90 to complete the circuit through the resistance 80 of the time switch. Regeneration continues until this element 80 has heated the arm 84 sufficiently to cause it to close the circuit at 85. Upon this completion of the circuit 76, the motor 60 is again started and the element 86 maintains the circuit closed until the motor has rotated the shaft 24 another half revolution and thus returns the valves to normal or service positions. It will be readily understood that the time switch may be designed to start the operation of the motor after any desired period of rest during which regeneration takes place. It will also be evident that other types of time switches, such as the common clock switch, may be substituted for the bimetal or resistance type illustrated.

In the forms of my invention above described, the pressure reducing valves 30 and 53 prevent drawing brine into the house or service pipes 19 and 54 respectively. Thus, when the waste valves in the pipes 18 and 55 are open, the pressures in the pipes 17 and 52 are insufficient to overcome the tendency of the reducing valves to close the openings into the service pipes 19 and 54.

It will now be evident that my water softening apparatus merely requires the closing of a switch to effect regeneration, and the valve arrangement is so simple and positive in its action that a minimum of repairs or other attention is needed. Obviously, in order to make the operation entirely automatic, it is only necessary to actuate the switch 40 (or 70) by connecting it to a water driven motor in the water supply conduit such as that described in Patent No. 1,627,903 to A. C. Horgland and L. G. Lindsay, dated May 10, 1927.

Having described my invention what I claim is new and desire to protect by Letters Patent is:

1. In water softening apparatus, the combination with a zeolite container, a brine tank, and conduits for passing water through said container and for delivering brine from said tank into said container, control valves disposed in the several conduits, a valve operating shaft, cams operable by said shaft to actuate said valves, a motor operatively connected to said shaft for turning the same, and electrical means for periodically starting and stopping said motor comprising a rotary switch element connected to said shaft, a motor control circuit including said element, a contact arranged in said circuit to co-act with said element in opening and closing said circuit, a starting switch and another circuit, including said starting switch, adapted to shunt said element and contact.

2. In water softening apparatus, the combination with a zeolite container, a brine tank, and conduits for passing water through said container and for delivering brine from said tank into said container, control valves disposed in the said conduits, a shaft, cams operable by said shaft to actuate said valves, a motor operatively connected to said shaft for turning the same, and electrical means for periodically operating said motor comprising a rotary switch operatively connected to said shaft and a motor control circuit including said switch, said switch and circuit being arranged to stop said motor upon the turning of said shaft through a predetermined angle.

3. The combination with a zeolite container and a brine tank of conduits for admitting water and brine to one end of said container, a pipe for withdrawing liquid from the opposite end of said container, a waste pipe and a service pipe communicating with said first mentioned pipe, a pressure reducing valve interposed between said first mentioned and service pipes for reducing the pressure in said service pipe, and valves for controlling the periods of softening and regeneration of said zeolites, one of said valves being located in said waste pipe.

4. In water softening apparatus, the combination with a zeolite container, a tank for regenerating fluid and conduits for passing water through said container and for delivering fluid from said tank into said container, of a series of control valves disposed in the several conduits, means adapted to actuate said valves, a motor operatively connected to said valve actuating means and electrical means for controlling said motor comprising a switch operable by said motor, a time switch under control of said first mentioned switch and electric circuits including said switches, said switches being adapted to interrupt the operation of said motor for a predetermined regeneration period and then to connect the same in circuit to further operate said valves.

5. In water softening apparatus, the combination with a zeolite container, a brine tank, and conduits for passing water through said container and for delivering brine from said tank into said container, a series of control valves disposed in the several conduits, means adapted to actuate said valves, a motor operatively connected to said valve actuating means and electrical means for controlling said motor comprising, a switch operable by said motor, a time switch under control of said first mentioned switch, electric circuits including said switches and a control switch in one of said circuits for starting said motor and actuating said valves, said first mentioned and time switches being adapted to interrupt the operation of said motor for a predetermined regenerating period and then to connect the same in circuit to restore said valves to their initial positions.

6. In water softening apparatus, the combination with a zeolite container, a brine tank, and conduits for passing water through said container and for delivering brine from said tank into said container, a series of control valves disposed in the several conduits, a shaft, means operable by said shaft to actuate said valves, a motor operatively connected to said shaft for turning the same and electrical means for controlling said motor comprising a rotary switch fixed on said shaft, a time switch under control of said first mentioned switch, electrical circuits including said switches and a control switch in one of said circuits for starting said motor, said rotary switch being adapted to interrupt the operation of said motor upon rotation of said shaft one half of a revolution and said time switch being adapted to subsequently start said motor after a predetermined period of rest to thereby further change the positions of said valves.

7. In water softening apparatus, the combination with a zeolite container, a brine tank, and conduits for passing water through said container and for delivering brine from said tank into said container, control valves disposed in the several conduits, a motor operatively connected to said valves for actuating the same, and electrical means for periodically starting and stopping said motor comprising a switch element movable by said motor, a motor control circuit including said element, a contact arranged in said circuit to co-act with said element in opening and closing said circuit, a starting switch and another circuit, including said starting switch, adapted to shunt said element and contact.

8. In water softening apparatus, the combination with a zeolite container, a brine tank, and conduits for passing water through said container and for delivering brine from said tank into said container, control valves disposed in the said conduits, a motor operatively connected to said valves for actuating the same, and electrical means for periodically operating said motor comprising a switch operatively connected to said motor and a motor control circuit including said switch, said switch and circuit being arranged to stop said motor upon the operation of said motor for a predetermined period.

9. In water softening apparatus, the combination with a zeolite container, a tank for regenerating fluid and conduits for passing water through said container and for delivering fluid from said tank into said container, of a series of control valves disposed in the several conduits, a motor operatively connected to said valves, a switch operable by said motor, a time switch under control of said first mentioned switch and electric circuits including said switches, said switches being adapted to interrupt the operation of said motor for a predetermined regeneration period and then to connect the same in circuit to further operate said valves.

In testimony whereof, I have hereunto signed my name to this specification.

LYNN G. LINDSAY.